United States Patent Office 3,639,319
Patented Feb. 1, 1972

3,639,319
PELLUCID HALOGEN-CONTAINING RESIN
COMPOSITIONS
Kenneth C. Bergman, Cleveland Heights, and Thomas C.
Jennings, Willowick, Ohio, assignors to Synthetic Products Company, Cleveland, Ohio
No Drawing. Filed July 14, 1969, Ser. No. 841,542
Int. Cl. C08f 45/62
U.S. Cl. 260—23
7 Claims

ABSTRACT OF THE DISCLOSURE

Pellucid halogen-containing resin compositions containing a vinyl halide resin such as polyvinyl chloride and, as pellucid metallic stabilizers, a combination of stannous and zinc salts of organic acids dispersed in the resin. These plastic compositions can be processed or molded under the action of heat into films, sheets and solid objects such as bottles without deterioration of the vinyl halide resin to provide colorless, transparent plastic articles.

BACKGROUND OF THE INVENTION

Halogen-containing resins, or more commonly "vinyl halide resins," are widely employed in the plastics industry as fabricating and packaging materials, protective coatings and a variety of other applications. Perhaps their most useful property is thermoplasticity because this property permits them to be molded into films, bottles and many other forms. However, when vinyl halide resins are processed or molded under the softening action of elevaetd temperatures, they tend to discolor and physically degrade. To prevent such deterioration, metal stabilizers have been frequently incorporated. These metal stabilizers, particularly metal soaps, are usually dispersed in the resin and tend to decrease the decomposition of the resin under the influence of heat to which they are subjected during processing or molding.

It has heretofore been known that metal stabilizers, while tending to provide heat stability to the vinyl halide resins, produce haziness or clouding of an otherwise usually clear plastic. Such haziness can result upon dispersion of the metallic stabilizer in the vinyl halide resins even without decomposition of the dispersion under elevated temperatures. Commonly, discoloration of the resin usually accompanies haziness. Theories have been proposed to explain such haze formation in metal stabilized vinyl resins, but perhaps it is generally accepted theory that haziness is attributed to metal chlorides or other insoluble decomposition products of the metal stabilizers under the action of heat.

Prior art attempts to overcome this problem of haze or cloud formation in metal stabilized vinyl halide resins have been directed to the use of additional ingredients which are purported to retard precipitation or formation of the metal halide or other compounds which are believed to cause haze in the plastic stock. For example, in U.S. 2,564,646 anti-clouding agents are added to metal salt stabilized vinyl halide resin compositions to reduce the undesirable haze formation in the processed resin. The anti-clouding agents proposed in the mentioned patent are organic phosphites. This approach has not been completely satisfactory for a number of reasons. Simply, the additional raw materials in the stock will increase the overall cost of satisfactory stabilization of the vinyl halide resin. Also, while such added anti-clouding agents may tend to retard precipitation of the metal halide, they or their degradation products may not be completely compatible with the vinyl resin or other plasticizing agents under most common extrusion or working conditions. Such agents tend to plasticize the vinyl halide resin and usually give rise to an increase in undesirable odor. Also, for certain end use purposes of the vinyl halide resin, such as food packaging, the stabilizers and other ingredients of the vinyl halide must be government approved as non-toxic which places serious limitations on additional ingredients which may be used as additives in vinyl halide resins.

SUMMARY OF THE INVENTION

This invention is predicated in part upon the empirical discovery that certain combinations of stannous and zinc salts of organic acids can be employed as pellucid metallic stabilizers for vinyl halide resins.

This invention is directed to an entirely new approach to the problem of haze or cloud prevention in processed or molded plastic vinyl halide compositions. According to our new concept, additional anti-clouding agents, such as the prior art phosphites referred to above, are not required in metal stabilized vinyl halide resins. Rather, certain metallic stabilizer combinations have been found to be transparent when dispersed in vinyl halide resins to yield pellucid compositions which maintain their pellucidity even under the influence of elevated temperatures.

It has been found that there exists a synergistic combination of metallic stabilizers, consisting essentially of stannous and zinc salts of organic acids, which has the unique property of pellucidity when dispersed in vinyl halide resins. Moreover, in addition to this unique pellucidity property, it has been discovered that this combination affords heretofore unachieved combined heat stability and clarity in vinyl halide resins.

In a preferred form of the invention, pellucid halogen-containing resin compositions are provided comprising a vinyl chloride resin and a pellucid metallic stabilizer combination consisting essentially of stannous and zinc salts of fatty acids having about $C_8$ to $C_{22}$ chain length. The stannous and zinc salts of fatty acids such as stearic acid are preferred because of non-toxicity and compatibility with commercially available vinyl halide resins. Also, fatty acid salts of zinc and tin, including the stearates and laurates, will yield colorless, crystal clear processed plastic. Moreover, metal salts of other organic acids are envisioned such as myristic, palmitic, oleic, linoleic, succinic, benzoic, t-butylbenzoic, tartaric, lactic, naphthenic, 2-ethylhexoic and phthalic acids.

We have found that certain ratios of zinc and stannous salts of organic acids contribute a heretofore unachievable degree of clarity or pellucidity to vinyl halide resins. This synergistic metallic combination can be employed in vinyl halide resins even in the presence of plasticizers, lubricants, secondary stabilizers such as polyols, epoxides, etc. and other ingredients commonly employed in the processing of such plastic compositions without destroying its pellucid properties. This is an important feature of this invention since plasticizers, and other ingredients, contribute to the variety of useful applications for the vinyl halide resins. Moreover, this particular combination of stannous and zinc salts of organic acids can still function as a heat stabilizer for the vinyl halide resin.

Although it has been discovered that the optimum ratio of the stannous salt to the zinc salt of the organic acid will depend in part upon the vinyl halide resin formulation, and the presence of other ingredients, the synergistic effects of these particular metal salts are independent of such formulation variables as plasticizers, epoxy modifiers, lubricants and secondary stabilizers. The synergistic activity of the metal stabilizer combination of this invention is indeed remarkable and clearly unexpected. When used alone, the stannous and zinc salts do not provide transparent, heat stabilized vinyl halide resins. It is known in U.S. Pat. 2,629,700 to use stannous salts as heat stabilizers for vinyl resins, but such stannous salts alone have proved unsatisfactory in achieving desired heat stability combined with clarity. Other apparently similar metal salts of fatty acids including magnesium, calcium, barium and the like either tend to easily discolor the plastic under elevated temperatures or cause an entirely unacceptable cloudiness or haziness in the plastic, particularly in unpigmented or clear stock applications.

The mechanism for the synergistic action of our metallic stabilizer combination with the vinyl halide resin is not completely understood. However, it is believed that each ingredient of our new combination contributes to high solubility or compatibility of the combination in the vinyl halide resin to yield transparent products which remain transparent even under the influence of elevated temperatures. Whatever the theory, the empirical results of specific examples which follow will demonstrate when certain ratios of the essential metallic stabilizer ingredients are used in the vinyl halide resin compositions, crystal clarity is achieved.

The halogen-containing resins which are employed to illustrate the principles of the method and compositions of this invention include chlorinated polyethylene, chlorinated polyvinyl chloride and the vinyl halide resin type. Vinyl halide resin, as mentioned, is a common term and is adopted herein to define those synthetic and natural resins and polymers usually derived by polymerization or copolymerization of vinyl monomers including vinyl chloride with or without other comonomers such as ethylene, propylene, vinyl acetate, vinyl ethers, vinylidine chloride, methyl acrylate, styrene, etc. A simple case is the conversion of vinyl chloride $H_2C:CHCl$ to polyvinyl chloride $(-CH_2-CHCl-)_n$ wherein the halogen is bonded to the carbon atoms of the carbon chain of the polymer. Other examples of such vinyl halide resins would include vinylidine chloride polymers, vinyl chloride-vinyl ester copolymers, vinyl chloride-vinyl ether copolymers, vinyl chloride-vinylidine copolymers, vinyl chloride-propylene copolymers; and the like. Of course, the vinyl halide commonly used in the industry is the chloride, although others such as bromide and fluoride may be used.

The synergism which we have found to exist with stannous and zinc salts of fatty acids has been demonstrated where the total pellucid metallic stabilizer concentration is in the range of about 0.05 up to about 3 parts per 100 parts by weight of vinyl halide resin and where the weight ratio of the stannous salt to the zinc salt is in the range of about 1:4 to 4:1 by weight, usually about 1.25:1 to 1:1.25. While as mentioned, the optimum ratio of the stannous salt to the zinc salt depends upon the particular vinyl formulation, the synergism per se appears to be independent of such formulation variables as plasticizers, lubricants and secondary stabilizers. Generally, based upon present data, in plasticized systems ratios higher in the zinc salt apparently are favored, whereas in rigid systems (absence of plasticizer) ratios higher in tin salt tend to be favored. While this is not precisely understood, we believe that it is due in part to solubility or compatibility of the complex combination in these systems. The present preferred overall ratio for the stannous and zinc salts is about 1:1 at about 0.05 to about 3 total parts of pellucid stabilizer concentration per 100 parts of the vinyl halide resin composition. Above about 3 parts of total stabilizer, haziness or opacity will tend to be observed. Below about 0.05 part by weight, the heat stabilizing activity of the stabilizer combination upon the vinyl halide resin diminishes. Of course, within the teachings of our discovery, the ratio of the stannous and zinc salts dispersed in the vinyl halide resin to achieve crystal clarity in the absence of discoloration may vary over a broader range. Having found that certain synergistic combinations of these particular metal salts can be employed to achieve the advantages of this invention, it will be obvious to those of ordinary skill in the art that these ratios of ingredients may be varied.

The objects and other advantages of the method and compositions of this invention with modifications thereof will be further understood with reference to the following examples. All numerical parts of ingredients referred to in the examples and tables are on a parts by weight basis.

EXAMPLES 1–5

Five formulations of vinyl halide polymer compositions were prepared by blending 100 parts polyvinyl chloride (Geon 103 EP, manufactured by B. F. Goodrich), 40 parts dioctyl phthalate plasticizer, 0.5 part glycerin and 1.5 parts or 0.75 part metal stabilizer(s). Example 1 contained 1.5 parts stannous stearate ($SnSt_2$); Example 2 contained 1.5 parts zinc stearate ($ZnSt_2$); Example 3 contained the pellucid metal stabilizer combination of this invention at 0.75 part stannous stearate and 0.75 part zinc stearate; Example 4 contained 0.75 part stannous stearate; and Example 5 contained 0.75 part of zinc stearate. Each of the five blends were milled for five minutes at 350° F. on a two-roll mill of the type commonly employed for blending and fusing plastic compositions and dispersing stabilizer ingredients. The milled stocks were formed into small sample squares for oven aging at 375° F. Every five minutes a small sample square was taken from the oven to test heat stability. In addition, the milled stocks were pressed to ⅛ inch thickness for three minutes at 350° F. on a common film press apparatus to test for clarity. The results of the press tests are shown in Table I.

TABLE I

| Example | Metallic soap | | Appearance of pressed sheet |
| | $SnSt_2$ | $ZnSt_2$ | |
|---|---|---|---|
| 1 | 1.5 | | Discolored and hazy. |
| 2 | | 1.5 | Hazy. |
| 3 | 0.75 | 0.75 | Clear and colorless. |
| 4 | 0.75 | | Discolored and slight haze. |
| 5 | | 0.75 | Slight haze. |

The press tests demonstrate surprisingly that when stannous and zinc stearates are employed in a weight ratio of about 1:1 at a total concentration of about 1.5 parts, the appearance of the pressed sheet was clear and colorless. On the other hand, stannous stearate alone at 1.5 parts and 0.75 part produced a discolored and hazy pressed sheet; and quite similarly, zinc stearate alone at 1.5 parts and 0.75 part produced a hazy pressed sheet. This pellucid stabilizer activity of the combination demonstrates synergism.

Furthermore, the combination of the stannous stearate and zinc stearate of Example 3 produced a longer color hold or heat stability upon oven aging than either the stannous or zinc stearate salts alone.

Thus, Examples 1–5 demonstrate that certain combinations of zinc and stannous stearates can be dispersed in vinyl halide resin plastic compositions to achieve transparent and colorless plastics which maintain these properties even at elevated temperatures of further processing.

EXAMPLES 6–8

To illustrate that there is a desired ratio of stannous stearate to the zinc stearate in the formulation employed in Example 1 for the production of extremely good clarity and lack of color degradation, several formulations of 100 parts vinyl halide resin (Geon 103 EP above mentioned), 40 parts dioctyl phthalate plasticizer and 0.5 part glycerin were prepared employing three different ratios of the stannous to zinc stearate and over a range of about 1 to about 1.5 parts total stabilizer concentration. The stock formulations were prepared, blended and roll-milled in accordance with the procedures mentioned in Example I. Press tests for clarity were also run on the formulations according to the above procedures and the results appear in Table II.

TABLE II

| Example | Metallic soap | | Appearance of pressed sheet |
|---|---|---|---|
| | SnSt$_2$ | ZnSt$_2$ | |
| 6 | 0.75 | 0.75 | Colorless and crystal clear. |
| 7 | 0.75 | 0.50 | Colorless and very slight haze. |
| 8 | 0.75 | 0.25 | Colorless and slight haze. |

This series of tests, as demonstrated by the above table, shows that there exists a desired ratio of stannous stearate to zinc stearate for excellent clarity and good color stability. For example, at a 1:1 weight ratio of 0.75 part stannous stearate to 0.75 part zinc stearate, the appearance of the press sheet was colorless and crystal clear. On the other hand, 0.75 part stannous stearate to 0.50 part zinc stearate (3:2 ratio) results in a colorless sheet but very slight haze was observed. Similarly, at the ratio of 0.75 part stannous stearate to 0.25 part zinc stearate (3:1 ratio), a colorless press sheet resulted but there was haze or opacity observed in the sheet.

Surprisingly, then, there appears to be an optimum ratio of stannous to zinc stearate as demonstrated by Table II for the formulation demonstrated to produce a crystal clear and colorless stabilized vinyl halide resin composition. Moreover, the prior art of metal stabilizers teaches that haziness increases with increasing soap or metal stabilizer concentration. In contrast, Table II demonstrates that this is not the case. The specific combination of stabilizers according to the principles of this invention of Table II exhibit a clarity synergism noticeable at higher combinations of total stabilizer concentration of zinc and stannous stearate. Thus, unexpectedly, with increasing total concentration of zinc and stannous stearate in this particular formulation and at a ratio of about 1:1, there is exhibited a crystal clear and colorless pressed vinyl halide sheet. This is an important discovery having utility in various fields of application such as plastic bottles and the like.

EXAMPLES 9–12

To further illustrate the effects of increasing concentrations of the pellucid stabilizer combination according to the principles of this invention, at a constant ratio of stannous to zinc stearate, four stock formulations were prepared (Examples 9–12) each containing a ratio of about 1:1 stannous stearate to zinc stearate in a total stabilizer concentration range of 1–15 parts per 100 parts of vinyl halide resin. Examples 9–12 were prepared as in Example 1 using the same procedures wherein the stannous and zinc stearate stabilizers are added to 100 parts of Geon 103 EP and 40 parts dioctyl phthalate plasticizer. The same press test above described was used on these four formulations and the results appear in Table III.

TABLE III

| Example | Metallic soap | | Appearance of pressed sheet |
|---|---|---|---|
| | SnSt$_2$ | ZnSt$_2$ | |
| 9 | 0.50 | 0.50 | Clear. |
| 10 | 1.00 | 1.00 | Do. |
| 11 | 1.50 | 1.50 | Slight haze. |
| 12 | 2.50 | 2.50 | Haze. |

Thus, Table III demonstrates the effect of increasing concentration in a given formulation at a constant ratio of zinc stearate to stannous stearate on the order of 1:1. As shown, at least up to 3 parts total pellucid stabilizer concentration per 100 parts vinyl halide resin results in a clear sheet. At 3 parts total stabilizer concentration a slight haze began to be observed and a definitely formed haze or opacity was seen at 5 parts. Thus, this data demonstrates that a particular vinyl halide resin composition containing plasticizer will achieve the results according to this invention wherein the total stabilizer concentration is employed in a range of about 1 to 2 parts and up to 3 parts, at a weight ratio of about 1:1.

EXAMPLES 13–15

As mentioned in the description above, the optimum ratio of stannous salt to zinc salt will depend on the particular vinyl formulation, but synergism per se to achieve the advantages of this invention appears to be independent of such formulation variables as plasticizers, epoxy modifiers, lubricants and secondary stabilizers. To demonstrate this, the following formulations were prepared.

The formulation components appear in Table IVA, designated Examples 13, 14 and 15. The ratios of stannous stearate (SnSt$_2$) to zinc stearate (ZnSt$_2$) comprising the 2 parts of metallic soap of Table IVA are listed in IVB under (a) through (i). These formulations were prepared in the manner similar to Example 1 and press tests were also performed in accordance with the procedure therein described. The results of the press tests appear in Table IVB.

TABLE IVA

| Example | | | Components |
|---|---|---|---|
| 13 | 14 | 15 | |
| 100 | 100 | 100 | PVC Resin (Geon 103 EP). |
| 40 | 40 | 40 | Dioctyl phthalate. |
| | 5 | | Epoxidized soybean oil. |
| | | 0.5 | Glycerin. |
| 2 | 2 | 2 | Metallic soap. |

TABLE IVB

| | Metallic soap | | Example | | |
|---|---|---|---|---|---|
| | SnSt$_2$ | ZnSt$_2$ | 13 | 14 | 15 |
| (a) | 2.00 | | 4 | 4 | 5 |
| (b) | 1.75 | 0.25 | 7 | 4 | 4 |
| (c) | 1.50 | 0.50 | 6 | 4 | 6 |
| (d) | 1.25 | 0.75 | 1 | 4 | |
| (e) | 1.00 | 1.00 | 2 | 2 | 3 |
| (f) | 0.75 | 1.25 | 3 | 1 | |
| (g) | 0.50 | 1.50 | 5 | 3 | 1 |
| (h) | 0.25 | 1.75 | 9 | 5 | 2 |
| (i) | | 2.00 | 8 | 6 | 7 |

NOTE.—Clarity Code: 1=crystal clear; 3=slight haze; 5=haze.

As illustrated by these tables, the total parts of the stannous stearate and zinc stearate were maintained at about 2 parts by weight and the weight ratio of stannous stearate to zinc stearate was varied over a range of about 2:0 to 0:2 ((a) through (i) of the Table IVB) for each of the three stock formulation Examples 13–15, containing in Example 13 resin and plasticizer; in Example 14 resin, plasticizer and epoxy modifier; and in Example 15 resin, plasticizer and secondary stabilizer. The clarities of the resulting press sheets for each of the individual formulations are described with reference to numerical range from 1–9. The clearest press sheet sample is given the numerical designation 1 and as the numerical figures increase to 9, clarity decreases, with the observation of a slight haze or opacity occurring at a numerical value of 3. Thus, the results of this table collectively demonstrate that the clarity synergism of stannous and zinc stearate in a vinyl halide resin formulation always exists even in the presence of other variables such as epoxy modifiers, plasticizers and secondary stabilizers. However, the optimum ratio of stannous to zinc stearate to achieve such synergism will vary with the specific formulation. For example, when 2 parts of stannous stearate are used alone IVB(a), in each of the three formulations, poor clarity or haze results. At the other end of the scale, when zinc stearate at 2 parts is used alone IVB(i), poor clarity or haze results. However, when samples designated IVB(d) through IVB(g) are compared for each of the three main examples, it is seen that the synergistic effect of the stabilizer combination exists in Example 13 when using a 5:3 ratio of SnSt$_2$:ZnSt$_2$ in IVB(d). Whereas, the best synergism exists in formulation IVB(f) for Example 14 at a ratio of 3:5 SnSt$_2$:ZnSt$_2$. Also, the optimum degree of clarity exists for Example 15 in IIIB(g) where a 1:3 ratio of $SnSt_2:ZnSt_2$ was used. In summary, the ratio of stannous stearate to zinc stearate at a total concentration of about 2 parts per 100 parts of resin in formulations containing plasticizer, modifiers and secondary stabilizers will vary from about 5:3 to about 1:3 as illustrated by this Table IVA and B. In general, however, it has been found that a preferred ratio of stannous stearate to zinc stearate over a range of total concentration from about 0.05 up to about 3 parts salt per 100 parts of plastic vinyl halide resin is on the order of about 1:4 to about 4:1.

EXAMPLES 16–17

To illustrate that the optimum pellucid stannous: zinc stearate ratio may vary in formulations which do not contain plasticizer, Examples 16 and 17 were run. These formulations were prepared on a parts by weight basis and the Tables VA and VB correspond in structural content to Tables IVA and IVB with numerical figures 1–5 illustrating both clarity and color.

TABLE VA

| | Example | | |
|---|---|---|---|
| | 16 | 17 | Components |
| | 100 | ---------- | Resin A (103 EP). |
| | ---------- | 100 | Resin B [1] (110X230). |
| | 0.5 | 0.5 | Glycerine. |
| | 2 | 2 | Metallic soap. |

[1] Resin B (B. F. Goodrich).

TABLE VB

| Metallic soap | | Example 16 | | Example 17 | |
|---|---|---|---|---|---|
| $SnSt_2$ | $ZnSt_2$ | Clarity | Color | Clarity | Color |
| (a) 1.75 | 0.25 | 1 | 3 | 2 | 4 |
| (b) 1.50 | 0.50 | 2 | 1 | 1 | 1 |
| (c) 1.00 | 1.00 | 3 | 2 | 3 | 2 |
| (d) 0.50 | 1.50 | 4 | 5 | 4 | 3 |
| (e) 0.25 | 1.75 | 5 | 4 | 5 | 5 |

Clarity Code:
  1=crystal clear.
  3=slight haze.
  5=haze.
Color Code:
  1=colorless—best heat.
  5=worst heat.

The formulations were prepared in a manner similar to the procedure in Example 1 by blending and the same press tests were performed to determine the clarity and color of the pressed sheets. The press tests for clarity and color appear in Table VB.

As in Table IV, the total parts concentration of stannous and zinc stearate were maintained at two, however, the ratios varied over a range of about 7:1 to about 1:7 of stannous stearate to zinc stearate. Optimum clarity for Example 16 which contained resin, lubricant and 2 parts metal soap stabilizer in a ratio of 7:1 stannous stearate to zinc stearate was achieved (see VB(a)). Whereas, for Example 17, optimum clarity was achieved at a ratio of about 3:1 of stannous stearate to zinc stearate. Collectively, Table VB illustrates that even in the absence of plasticizers, the synergistic pellucid effect of the zinc salt and stannous salt of organic acids can be achieved to produce clear and colorless plastic compositions stabilized against degradation under the influence of processing heat. Also, by comparing Examples 15 and 16 directly, it shows that the optimum ratio of $SnSt_2:ZnSt_2$ has shifted in the absence of plasticizer from about 1:3 to about 7:1. (Comparing IVB(g) with VB(a)). As mentioned, in unplasticized systems, an excess of stannous stearate presently appears preferable.

EXAMPLES 18–22

Other fatty acid salts of stannous tin and zinc can be employed in accordance with the principles of this invention. Stannous laurate and zinc laurate were substituted for stannous stearate and zinc stearate, respectively, in Examples 6–8 compositions heretofore described. The technique for incorporating the metallic stabilizers into the vinyl halide resin formulations of Example 1 was the same and similar proportions of stannous laurate and zinc laurate were substituted for the metallic stearates. The resultant compositions after milling were press tested according to the procedure described in Example 1. The results of the press tests appear in Table VI under Examples 18 through 22 as follows:

TABLE VI

| | Metallic soap | | Appearance of pressed sheet | |
|---|---|---|---|---|
| Example | Stannous laurate | Zinc laurate | Clarity | Color |
| 18 | 1.50 | ---------- | Clear | Orange. |
| 19 | 0.75 | 0.75 | Slight haze | Colorless. |
| 20 | 0.75 | 0.50 | Clear | Do. |
| 21 | 0.75 | 0.25 | ___do___ | Orange. |
| 22 | ---------- | 1.50 | Black | Black. |

Table VI demonstrates that the stannous and zinc laurates can be substituted for the stearates and achieve the pellucid activity in accordance with the principles of this invention. For example, when stannous laurate is used alone at 1.50 parts in combination with the vinyl halide resin, as illustrated in Example 18, a clear press test resulted but the color was orange. In contrast, Examples 19 through 21 demonstrate that the synergistic pellucid activity of the combined stannous laurate and zinc laurate exists at 0.75 stannous laurate and 0.50 zinc laurate (Example 20). Whereas, as 0.75 stannous laurate and 0.75 zinc laurate, a slight haze was observed. At the other end of the scale, zinc laurate alone at 1.50 parts produced a black press sheet entirely unsuitable as compared to the results of this invention.

In summary, Table VI illustrates that other fatty acid salts of stannous tin and zinc can be employed to achieve the advantages clarity of this invention with maintainance of good color. Moreover, the optimum ratio of stannous laurate to zinc laurate is on the order of 3:2 when employed in about 1.25 parts of total stabilizer concentration to 100 parts of vinyl halide resin in the formualtion described.

EXAMPLES 23–27

The series of Examples 23 through 27 were run to compare the effect of increasing total amounts of stannous laurate and zinc laurate in a vinyl halide resin composition while the ratio of the stannous salt to the zinc salt is maintained at about 1:1 in a maner similar to Examples 9–12, supra. Again the formulating procedures used in Examples 9–12 were employed in these examples with the exception that stannous laurate and zinc laurate were substituted for the metal stearates of Examples 9–12. The blending, mill rolling, and press testing procedures were also the same. The results of the press testing of the Examples 23 through 27 appear in Table VII as follows:

TABLE VII

| | Metallic soap | | Appearance of pressed sheet | |
|---|---|---|---|---|
| Example | Stannous laurate | Zinc laurate | Clarity | Color |
| 23 | 0.25 | 0.25 | Black | Black. |
| 24 | 0.50 | 0.50 | Clear | Colorless. |
| 25 | 1.00 | 1.00 | ___do___ | Do. |
| 26 | 1.50 | 1.50 | Slight haze | Do. |
| 27 | 2.50 | 2.50 | Opaque | Do. |

Comparing Tables III and VII, the stannous laurate and zinc laurate combination behaves quite similarly to the stearate systems. In other words, there is pellucid synergism when a total concentration of about 1 to 2 parts up to 3 parts is used at a ratio of 1:1. The press tests demonstrating this were clear and colorless (see Examples 24 and 25). However, at 3 parts total stabilizer concentration, haze was observed (Example 26) and at five parts the sample became opaque (Example 27).

Also, at the low total concentration of 0.50 part in Example 23, the vinyl halide composition deteriorated and became black at the high temperature conditions of the test. However, it is to be emphasized that this concentration is entirely satisfactory at other lower temperatures or shorter exposure times which would be encountered, for example, in the production of plastic bottles and the like, to achieve the advantages of this invention. Moreover, secondary heat stabilizers can be added to contribute to heat stability, if desired, for certain high temperature process applications.

EXAMPLES 28–31

As previously discussed and empircally determined, the synergistic activity of the pellucid stabilizers of this invention is maintained even though the formulation includes plasticizers, modifiers, lubricants and secondary stabilizers. In order to further illustrate that lubricants ($CaSt_2$) can be used with the stannous and zinc metal salts, Examples 28 through 30 were prepared, milled and press sheet tested according to the procedures above described in Example 1 except that 100 parts Geon 103 EP were employed with 40 parts dioctyl phthalate and calcium stearate ($CaSt_2$) was used as a lubricant. In Example 31 trisnonylphenylphosphite (TNPP) was substituted as an anti-clouding agent for stannous stearate in Example 30 to compare the clarity of the resulting compositions. The press test results appear in Table VIII as follows:

TABLE VIII

| Example | Metallic soap | | | Chelator TNPP | Appearance of pressed sheet | |
|---|---|---|---|---|---|---|
| | $CaSt_2$ | $ZnSt_2$ | $SnSt_2$ | | Clarity | Color |
| 28 | 0.50 | 0.50 | | | Slight haze | Colorless. |
| 29 | 0.50 | 0.25 | 0.25 | | Clear | Do. |
| 30 | 0.50 | 0.50 | 0.50 | | do | Do. |
| 31 | 0.50 | 0.50 | | 0.50 | Slight haze | Do. |

Table VIII demonstrates that calcium stearate can be effectively employed with the pellucid stabilizer combination of this invention without upsetting the synergistic action. This is shown by Examples 29 and 30. On the other hand, in Example 28, calcium stearate and zinc stearate produced a press test sheet having a slight haze, and this shows that other combinations of apparently similar metal soaps will not yield the advantageous results of this invention.

Table VIII also demonstrates that phosphites of the type disclosed by U.S. Pat. 2,564,646, as anti-clouding agents, are not as effective as the method and composition of this invention. By comparison of Examples 30 and 31 it is apparent that the direct substitution of a phosphite (TNPP) for stannous stearate in the compositions results in a pressed sheet having haze. Whereas, the composition based on the teachings of this invention has crystal clarity.

In view of the above detailed description and numerous empirical examples illustrating the practice of this invention, it will appear obvious to those of ordinary skill that modifications can be made to achieve the advantageous results and objects of this invention and it is to be understood that such modifications are within the spirit and scope of this invention.

What is claimed is:

1. A pellucid halogen-containing resin composition consisting essentially of a vinyl halide resin and a metallic stabilizer combination consisting of stannous and zinc salts of fatty acids wherein said stabilizer combination is present in a total effective amount in the range of about 0.05 up to about 3 parts by weight based upon 100 parts by weight of said resin and the weight ratio of the stannous to zinc salts is in the range of about 7:1 to about 1:4.

2. The composition of claim 1 wherein the vinyl halide is vinyl chloride.

3. The composition of claim 1 wherein the fatty acid has a chain length of about $C_8$ to $C_{22}$.

4. The composition of claim 1 wherein the fatty acid is stearic acid.

5. A pellucid halogen-containing resin composition consisting essentially of a vinyl chloride resin and a metallic stabilizer combination consisting of stannous and zinc salts of fatty acids having about a $C_8$ to $C_{22}$ chain length wherein said stabilizer combination is present in a total effective amount in the range of about 0.05 up to about 3 parts by weight based upon 100 parts by weight of said resin and the weight ratio of the stannous to zinc salts is in the range of about 4:1 to about 1:4.

6. The composition of claim 5 wherein the fatty acid is selected from the group consisting of stearic, palmitic, myristic and lauric acids and mixtures thereof.

7. The composition of claim 5 wherein the weight ratio is 1.25:1 to 1:1.25.

References Cited

UNITED STATES PATENTS 2,564,646  8/1951  Leistner et al. _____ 260—45.7
2,629,700  2/1953  Caldwell et al. _____ 260—23

OTHER REFERENCES

Chevassus et al.: "The Stabilization of Polyvinyl Chloride" (1963), p. 111.

DONALD E. CZAJA, Primary Examiner

D. J. BARRACK, Assistant Examiner

U.S. Cl. X.R.

260—45.75 R, 45.75 K, 45.85

UNITED STATES PATENT OFFICE
CERTIFICATE OF CORRECTION

Patent No. 3,639,319    Dated February 1, 1972

Inventor(s) Thomas C. Jennings & Kenneth C. Bergman

It is certified that error appears in the above-identified patent and that said Letters Patent are hereby corrected as shown below:

Col. 1, line 34, change "elevaetd" to --elevated--

Col. 5, line 50, change "1-15" to --1-5--

Col. 8, line 35, change "advantages" to --advantageous--

Signed and sealed this 20th day of June 1972.

(SEAL)
Attest:

EDWARD M. FLETCHER, JR.           ROBERT GOTTSCHALK
Attesting Officer                  Commissioner of Patents